United States Patent [19]

Hehl

[11] Patent Number: 4,487,569
[45] Date of Patent: Dec. 11, 1984

[54] INJECTION MOLDING MACHINE WITH PIVOTABLE DIE CLOSING UNIT

[76] Inventor: Karl Hehl, Arthur-Hehl-Strasse 32, 7298 Lossburg 1, Fed. Rep. of Germany

[21] Appl. No.: 487,251

[22] Filed: Apr. 21, 1983

[30] Foreign Application Priority Data

Apr. 21, 1982 [DE] Fed. Rep. of Germany ....... 3214728

[51] Int. Cl.³ .............................................. B29F 1/00
[52] U.S. Cl. .................................. 425/575; 425/589; 425/451
[58] Field of Search ............... 425/575, 589, 574, 576, 425/451

[56] References Cited

U.S. PATENT DOCUMENTS

| | | | |
|---|---|---|---|
| 3,086,244 | 4/1963 | Hehl | 425/593 |
| 3,350,746 | 11/1967 | Blumer | 425/575 |
| 3,751,203 | 8/1973 | Hehl | 425/450.1 |
| 3,761,214 | 9/1973 | Hehl | 425/589 |
| 3,804,576 | 4/1974 | Hehl | 425/575 |
| 3,852,010 | 12/1974 | Hehl | 425/593 |

Primary Examiner—Jeffery Thurlow
Assistant Examiner—V. Fischbach
Attorney, Agent, or Firm—Joseph A. Geiger

[57] ABSTRACT

An injection molding machine with a mechanism for pivotably repositioning the die closing unit between a horizontal orientation and a vertical orientation, featuring a pivot frame composed of tubular members to which the die closing unit is fixedly attached and two transversely aligned stationary pivot bearings on the machine base, in relation to which the pivot frame is axially adjustable by means of two threaded spindles. The pivotal repositioning is obtained by means of a worm gear drive on one of the pivot shafts, and both pivot shafts cooperate with threaded clamping plugs which press the pivot frame members against the pivot bearings to transfer the pivot connections into rigid mounting attachments on the machine base.

17 Claims, 12 Drawing Figures

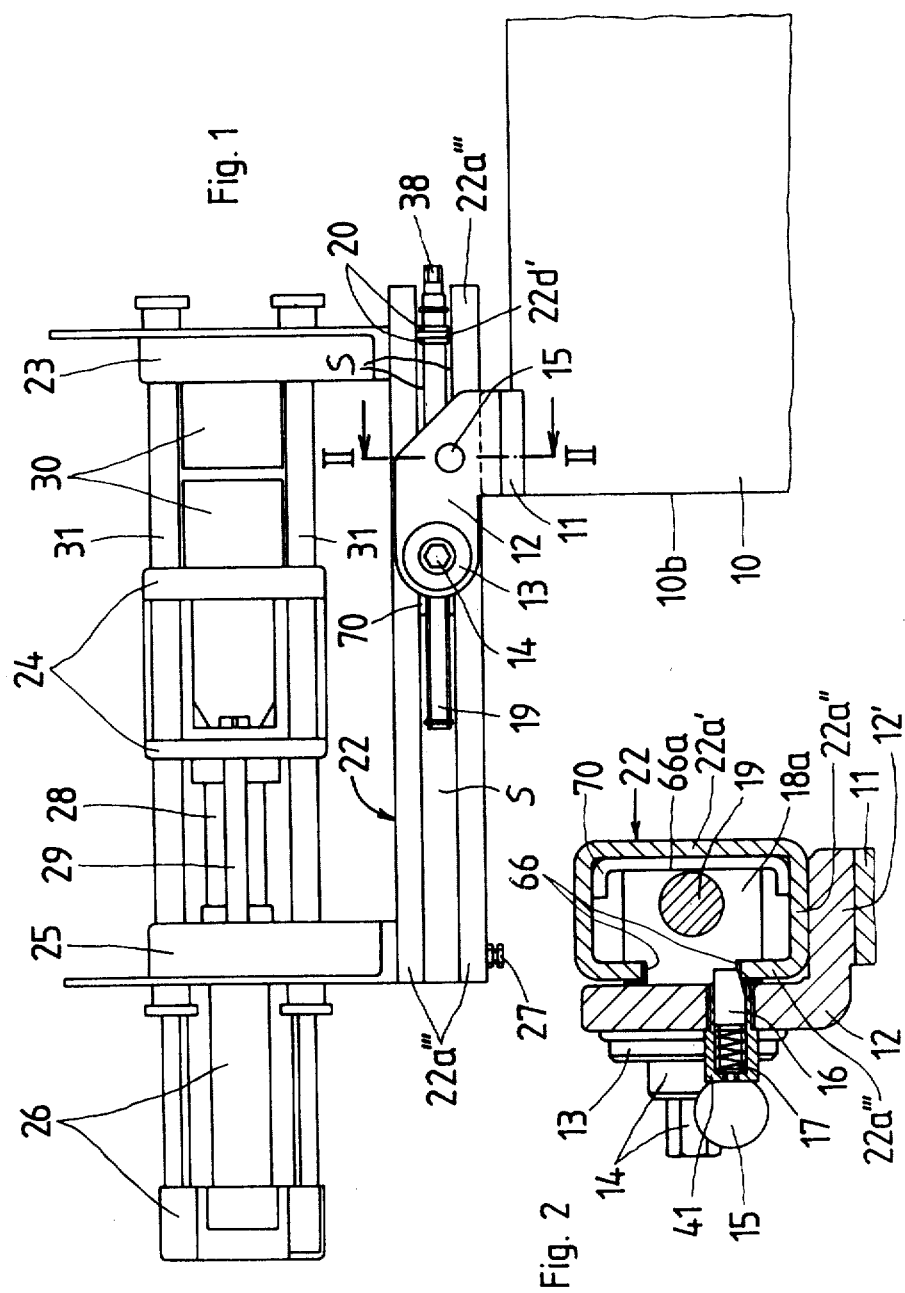

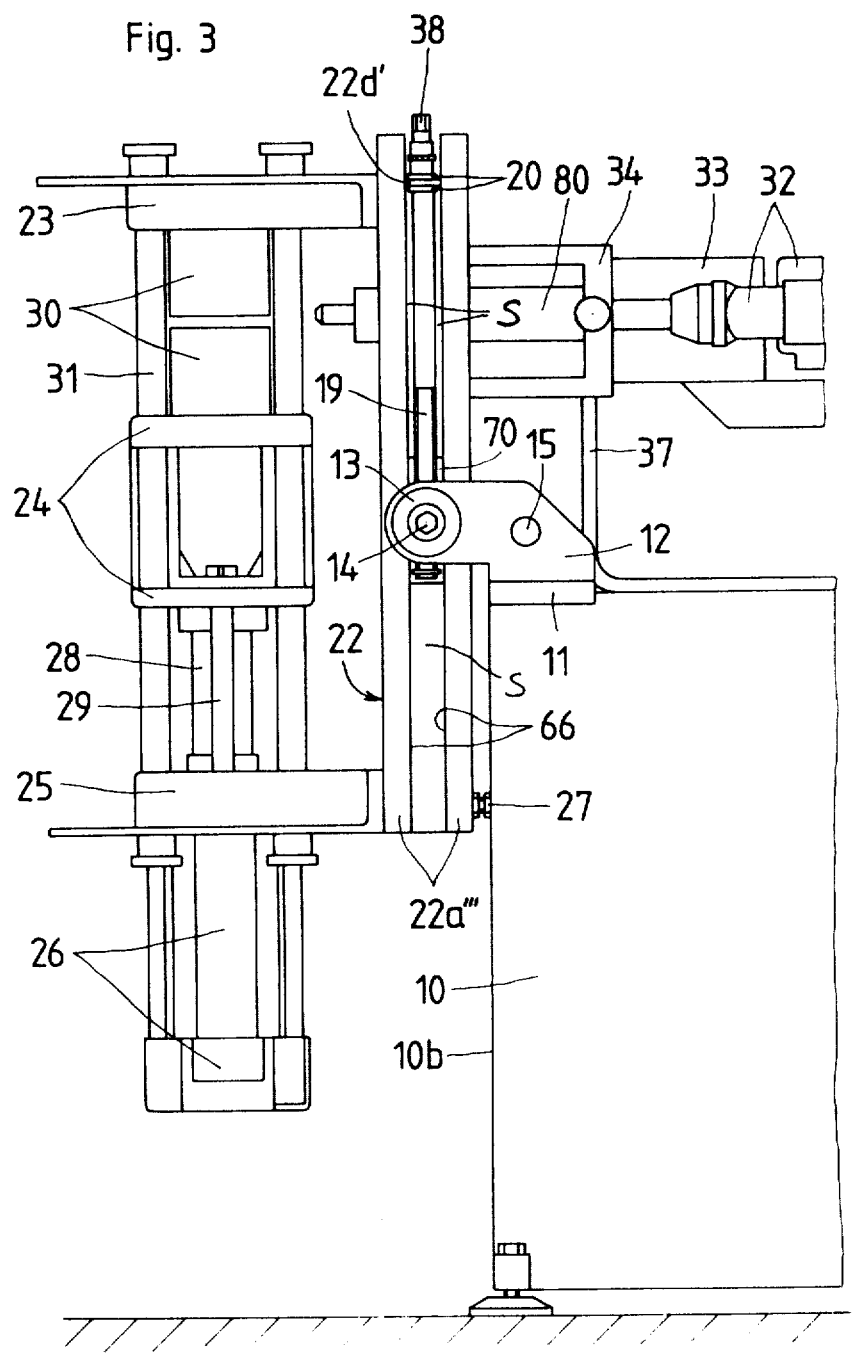

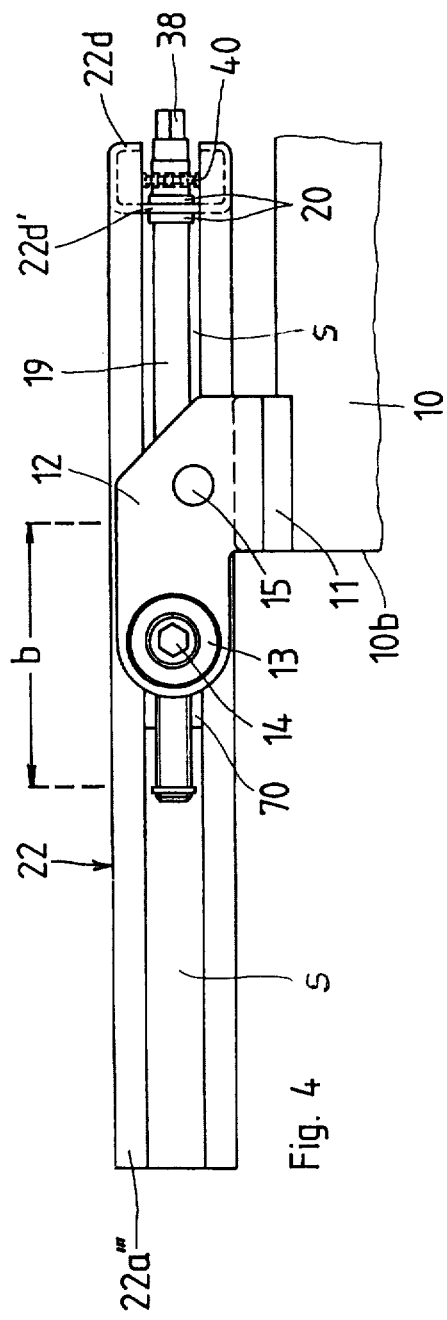
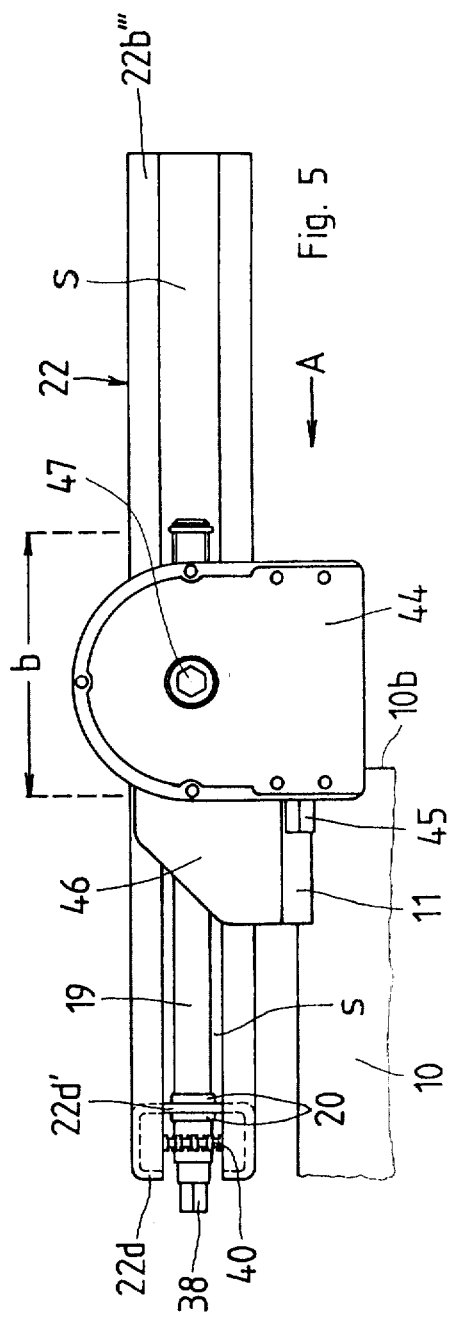

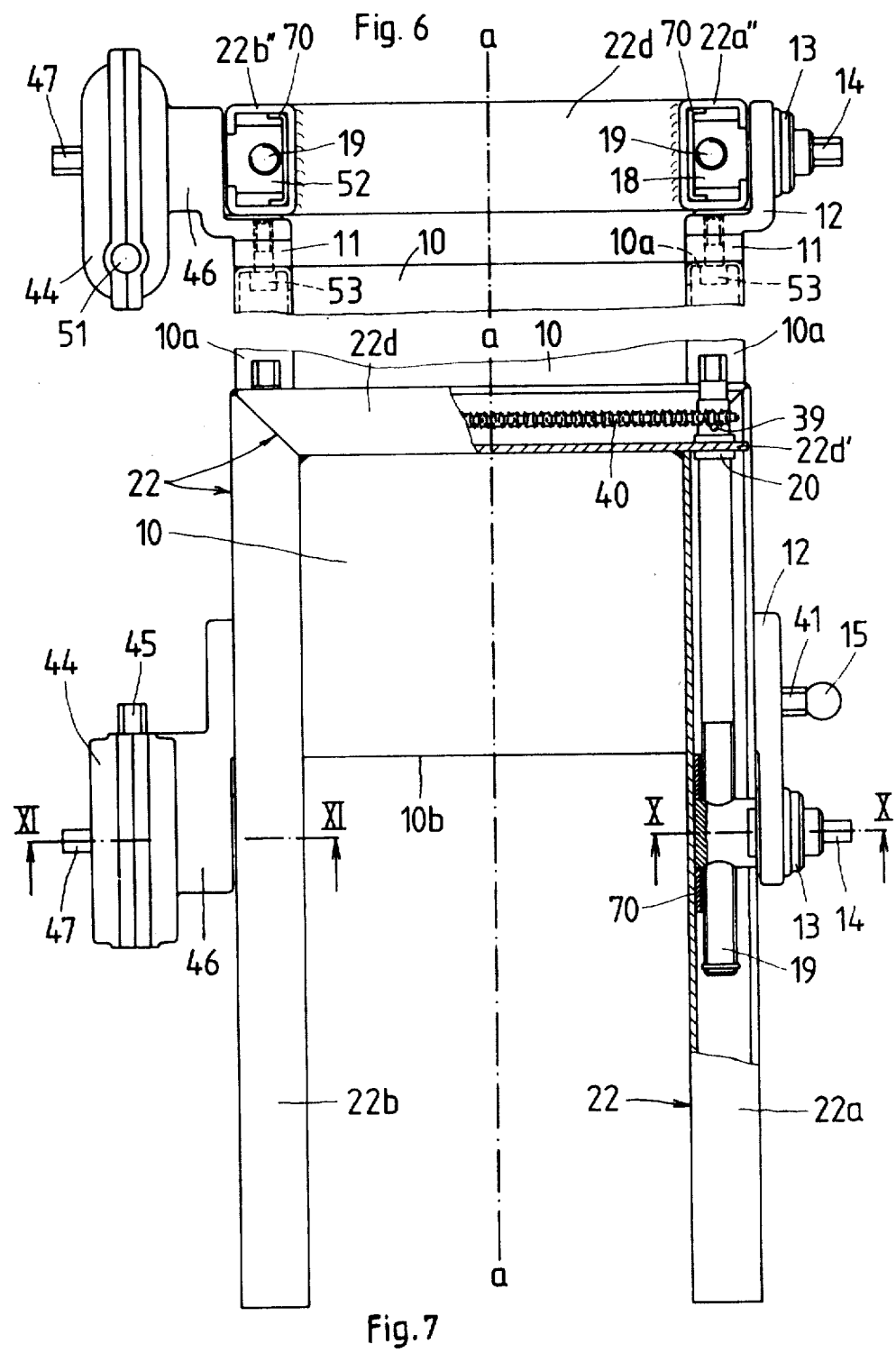

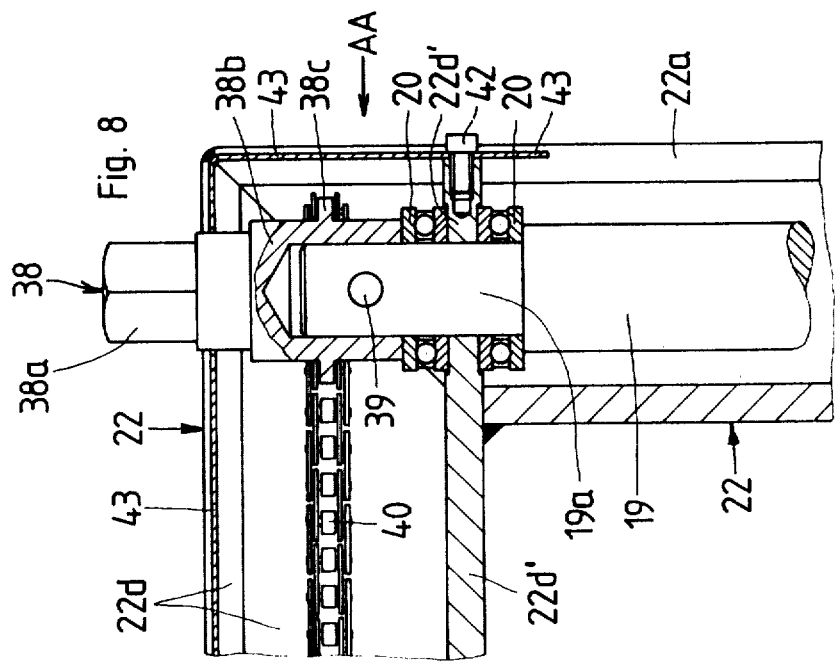
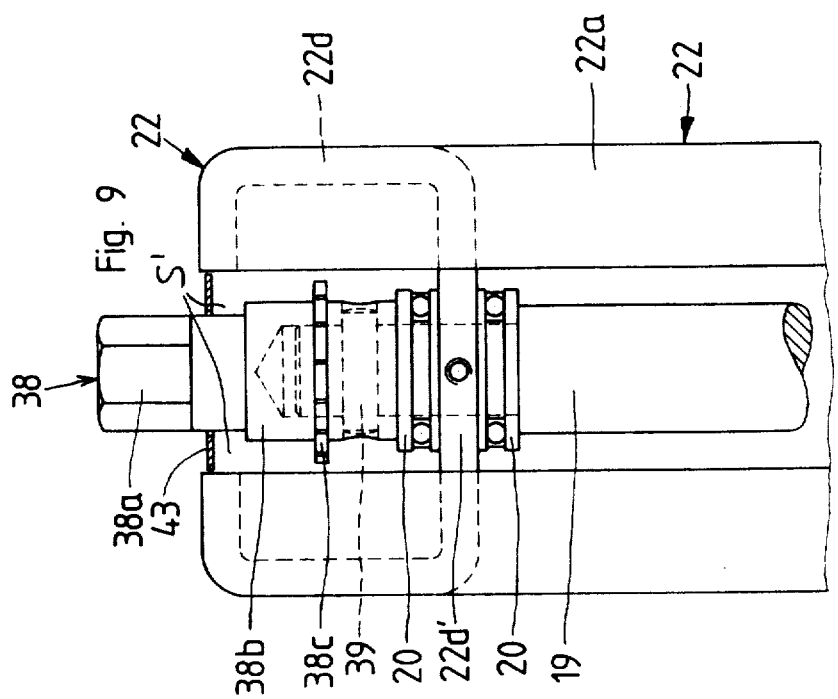

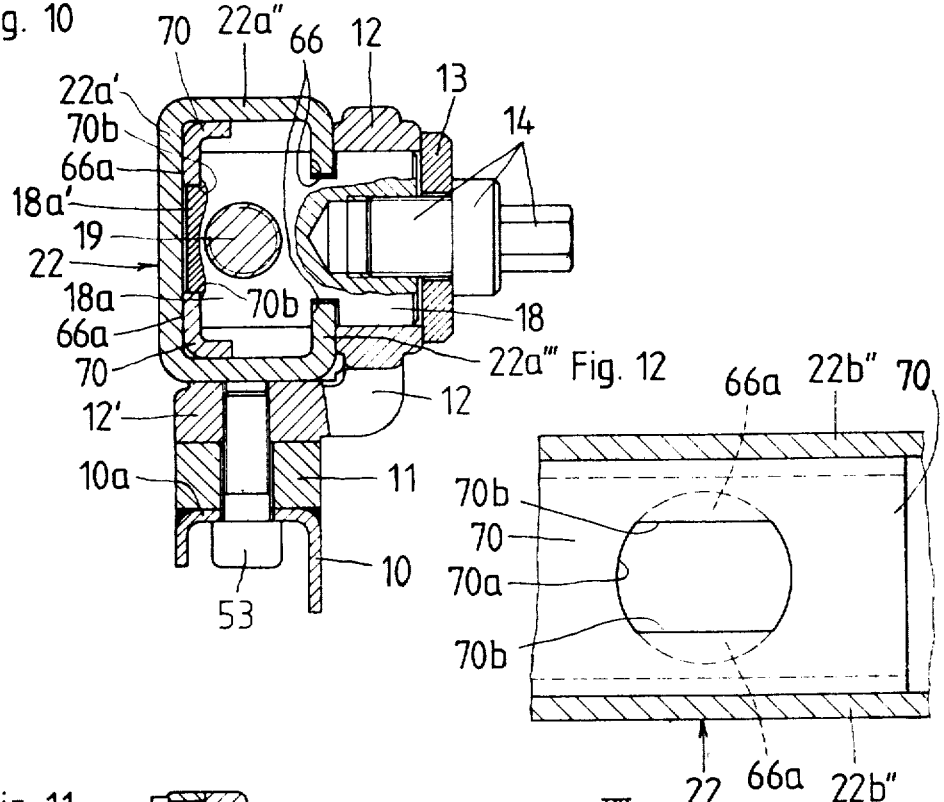
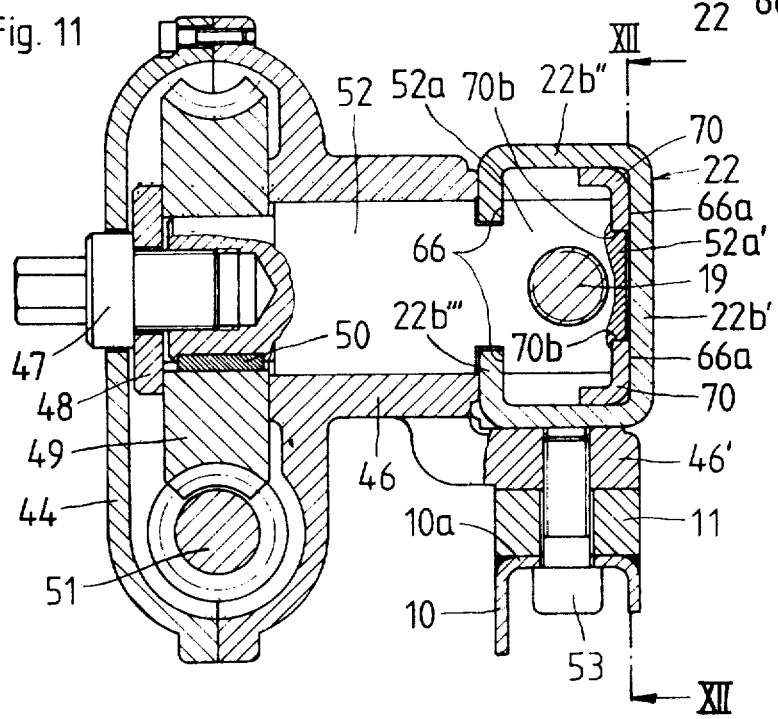

INJECTION MOLDING MACHINE WITH PIVOTABLE DIE CLOSING UNIT

BACKGROUND OF THE INVENTION

1. Field of the Invention

The present invention relates to injection molding machines and, more particularly, to a plastics injection molding machine which has a die closing unit mounted on a pivot frame, for the selective horizontal or vertical orientation of the die closing unit on the machine base of the injection molding machine.

2. Description of the Prior Art

In the majority of injection molding machines, the die closing unit is oriented horizontally, meaning that the die opening and die closing movements take place along a horizontal axis. For the axial injection of plastic raw material into the injection molding die, the injection unit is located conveniently on top of the machine base, immediately behind the stationary die carrier plate, or behind the stationary cylinder assembly, in the case of a pull-type die closing unit. For radial injection, i.e. injection in the parting plane of the injection molding die, it is necessary for the injection unit to be mounted either on top of the stationary die carrier plate or on the horizontal tie rods, in a vertical orientation.

For certain production situations, it has been found to be preferable to obtain a radial injection configuration by moving the die closing unit into a vertical orientation, so that the injection unit can be mounted horizontally on top of the machine base, in essentially the same arrangement which is used for the axial injection with a horizontally oriented die closing unit. However, the lack of vertical adjustability of the injection unit on the machine base makes it necessary for the vertically oriented die closing unit to be adjustable axially—i.e. vertically—in relation to the machine base, in order to achieve alignmen,t between the injection nozzle of the injection unit and the parting plane of the injection molding die.

For a selective horizontal and vertical orientability of the die closing unit, it is therefore necessary to arrange the die closing unit on a horizontal pivot axis near the forward upper extremity of the machine base and, further, to make the die closing unit axially adjustable in relation to this pivot axis.

The prior art in this field includes U.S. Pat. No. 3,086,244 which discloses an injection molding machine which utilized the tie rods of the die closing unit to serve both as stationary guides for the movable die carrier plate and as supporting members for the entire die closing unit. For this purpose, the two tie rods engage clamping bores of two pivotable bearing supports. The axial adjustability of the die closing unit is obtained by shifting the tie rods in these clamping bores. But, because the tie rods are subject to deflection under the weight of the die closing unit, this configuration is suitable only for an injection molding machine with a short and lightweight die closing unit.

Another injection molding machine with a pivotable die closing unit is disclosed in U.S. Pat. No. 3,751,203. In this case, the die closing unit is carried by a pivot frame which is pivotably connected to the upper extremity of the machine base by means of a transversely mounted pivot shaft. The axial adjustability of the die closing unit in relation to the pivot shaft is obtained by adjustably clamping the stationary cylinder mount of the die closing unit to the pivot frame, using sliding members which are clampable against matching profiles of the pivot frame.

A similar solution is proposed in U.S. Pat. No. 3,852,010 which discloses a configuration in which the pivot frame is an optional component, the horizontally oriented die closing unit being mountable either on top of the pivot frame or directly on top of the machine base.

All these prior art solutions have practical limitations, because of their lack of structural rigidity and/or their structural complexity, arising from the need for an axial adjustability of the vertically oriented die closing unit.

SUMMARY OF THE INVENTION

Underlying the present invention is the primary objective of suggesting an improved mechanism for pivotably repositioning the die closing unit on the machine base of an injection molding machine with a pivoting structure that is strong and rigid and therefore suitable for use with a very heavy die closing unit. The proposed arrangement, in addition to providing the required axial adjustability for the vertically oriented die closing unit, must also support the horizontally oriented die closing unit in a stable manner, particulary in the case in which the center of gravity of the unit is located outside the extremity of the machine base.

The present invention proposes to attain this objective by suggesting a mechanism for pivotably repositioning the die closing unit between a normal horizontal orientation and an inclined or vertical orientation, the improved pivoting mechanism comprising a pivot frame formed of at least two transversely spaced longitudinal frame members arranged below and in parallel alignment with the tie rods of the die closing unit and fixedly attached to the stationary structure of the latter to form a rigid assembly therewith, the longitudinal frame members being connected to and supported by two pivot shafts which are received in axially aligned bores of two pivot bearings, the connections between the pivot shafts and the longitudinal frame members including means for longitudinally repositioning the pivot frame in relation to the pivot shafts. The pivot bearings are arranged on the upper forward extremity of the machine base, defining a transverse horizontal pivot axis.

In a preferred embodiment of the invention, the connections between the pivot shafts and the pivot frame further define means for releasably clamping the longitudinal frame members of the pivot frame against rotational clamping faces of the two bearing supports, so as to secure the pivot frame and the attached die closing unit in both the pivotal and the longitudinal adjustment position. The longitudinal repositioning means and the frame member clamping means are preferably combined to take the form of a slidable connection which is transformed into a structurally rigid connection by the actuation of the clamping means.

For this purpose, the invention further suggests that the longitudinal members of the pivot frame be in the form of tubular members of rectangular cross-sectional outline. These longitudinal members have a longitudinal slot in their vertical outer wall portions, for the accommodation of inwardly extending shaft portions of the pivot shafts which reach into the tubular frame members. The vertical flange portions of the frame members on vertically opposite sides of the longitudinal slot thereby engage matching diametrally oppositely located chord grooves in the pivot shafts to provide guidance during axial adjustment displacements of the pivot frame at the pivot connections, in cooperation with rectangular guide members at the inner extremities of the pivot shafts which also provide guidance by slidingly engaging the inner vertical wall portions and the upper and lower horizontal wall portions of the tubular frame members. These rectangular guide members also secure the pivot shafts against rotation relative to the pivot frame.

The frame member clamping means preferably includes two threaded clamping plugs which engage threaded bores in the outer extremities of the pivot shafts and abut, directly or indirectly, against the outer sides of the pivot bearings. These clamping plugs pull the pivot shafts outwardly, thereby clamping the vertical portions of the longitudinal frame members between the chord grooves of the pivot shafts and a planar clamping face of the pivot bearings.

The invention further suggests for the pivot shafts to be non-rotatable in relation to the longitudinal frame members, for the transmission of a pivoting torque to the pivot frame and the attached die closing unit. This pivoting torque is preferably applied manually to one of the two pivot shafts, using a simple self-locking worm gear drive.

Lastly, the present invention also suggests the use of two threaded spindles for the axial displacement of the pivot frame and attached die closing unit in relation to the pivot axis. This is conveniently accomplished by arranging the two spindles inside the tubular longitudinal frame members, where they engage threaded bores of the pivot shafts, the spindles being axially supported by thrust bearings mounted in a pivot frame cross member and interconnected for synchronous rotation by means of a roller chain which is likewise arranged in the cross member.

The mechanism proposed by the present invention thus provides excellent structural rigidity and strength for the support of even a very heavy die closing unit, while adding a minimum of weight to the injection molding machine. It suggests simple, self-locking drive mechanisms for the pivotable repositioning of the die closing unit and for the axial adjustment of the latter, especially in its vertical orientation, in the form of a worm gear and two synchronized threaded spindles, respectively. Once the pivotal and axial settings of the die closing unit are reached, these settings can be rendered rigid through the actuation of the frame member clamping means. This makes it possible to relieve the adjustment drives of any stress during the production run of the injection molding machine.

BRIEF DESCRIPTION OF THE DRAWINGS

Further special features and advantages of the invention will become apparent from the description following below, when taken together with the accompanying drawings which illustrate, by way of example, a preferred embodiment of the invention, represented in the various figures as follows:

FIG. 1 shows, in a frontal view, an injection molding machine with a pivotable die closing unit featuring a pivoting mechanism embodying the present invention, the die closing unit being shown in horizontal orientation;

FIG. 2 shows, in an enlarged transverse cross section taken along line II—II of FIG. 1, one of the pivot bearings of the pivot mechanism;

FIG. 3 is a frontal view similar to that of FIG. 1, showing the die closing unit in vertical orientation;

FIG. 4 shows the pivoting mechanism of FIG. 1 in an enlarged frontal view;

FIG. 5 shows the pivot mechanism of FIG. 4, as seen from the opposite side;

FIG. 6 shows the pivot mechanism of FIGS. 4 and 5 in an end view from direction A;

FIG. 7 shows the pivot mechanism of FIGS. 4–6 in a partially sectioned plan view;

FIG. 8 shows a further enlarged detail of FIG. 7;

FIG. 9 shows the detail of FIG. 8 in a frontal view from direction AA;

FIG. 10 shows the front pivot connection in an enlarged vertical cross section taken along line X—X of FIG. 7;

FIG. 11 shows the rear pivot connection in a similar vertical cross section taken along line XI—XI of FIG. 7; and FIG. 12 shows a portion of a longitudinal cross section taken along line XII—XII of FIG. 11.

DESCRIPTION OF THE PREFERRED EMBODIMENT

FIGS. 1 and 3 of the drawing show the forward extremity of the machine base 10 of an injection molding machine on which is mounted a die closing unit which is pivotable for operation in either a horizontal orientation (FIG. 1) or a vertical orientation (FIG. 3).

The die closing unit consists essentially of a stationary die carrier plate 23, a movable die carrier frame 24, a stationary cylinder head 25 and four parallel tie rods 31 extending between the stationary plates 23 and 25. The movable die carrier frame 24 is supported and guided on the tie rods 31, being driven for die opening and closing movements by a hydraulic drive assembly 26 which consists of a central power cylinder and laterally arranged auxiliary cylinders of which the piston rods 28 and 29 are connected to the movable die carrier frame 24. The stationary die carrier plate 23 and the movable die carrier frame 24 carry the two halves of an injection molding die 30.

The four tie rods 31 form a rigid structure with the stationary die carrier plate 23 and the stationary cylinder head plate 25. This frame-like structure is further stiffened by a pivot frame 22 which is bolted to the bottom sides of the two plates 23 and 25 and which thereby supports the entire die closing unit. The pivot frame 22 consists of two longitudinal frame members 22a and 22b and a transverse frame member 22d on the side of the stationary die carrier plate 23. This pivot frame is described in more detail further below in connection with FIGS. 4–7.

FIG. 3 shows an injection unit which is mounted on top of the machine base 10, for radial injection into the partition plane of the injection molding die 30 of a vertically oriented die closing unit. The same injection unit also serves for axial injection in the normal horizontal orientation of the die closing unit (FIG. 1). This type of injection unit arrangement is well known, and no injection unit is therefore shown in FIG. 1.

Only the forward portion of an injection unit can be seen in FIG. 3. The latter shows a plastification cylinder 80 with an injection nozzle aimed at the partition plane of the injection molding die 30, an adapter frame 34 attaching the injection unit to the underside of pivot frame 22, a supporting bridge 32, a cover 33 for the plastificaton cylinder 80, and lateral runners 37 supporting the weight of the injection unit on the upper side of the machine base 10.

In the horizontal orientation of the die closing unit, the same injection unit is mounted directly behind the stationary die carrier plate 23, and the injection nozzle is always in alignment with the center of the injection molding die 30. But, when the die closing unit is oriented vertically, as shown in FIG. 3, either the injection unit or the die closing unit must have vertical adjustability, in order to align the injection nozzle with the partition plane of any one of a number of different injection molding dies.

The present invention therefore provides vertical adjustability for the die closing unit, by making the pivot frame 22 longitudinally displaceable in relation to its point of attachment at the machine base, i.e., in relation to the transverse horizontal axis about which the die closing unit is pivotable. The pivot assemblies which make such an axial adjustability possible are shown in FIGS. 10 and 11.

As can be seen in FIGS. 10 and 11, the two longitudinal members 22a and 22b of the pivot frame 22 form part of two separate pivot assemblies, the front pivot assembly being shown in FIG. 10, and the rear pivot assembly being shown in FIG. 11. The two longitudinal frame members have a rectangular tubular cross section, being die-formed of heavy-gauge steel sheet. Each longitudinal frame member has an inner vertical wall portion 22a' or 22b', upper and lower horizontal wall portions 22a" or 22b" and an outer vertical wall with a central longitudinal slot S defining upper and lower vertical flange portions 22a''' or 22b''', respectively.

In the front pivot assembly of FIG. 10, the longitudinal frame member 22a cooperates with a transversely oriented pivot shaft 18 which has a shaft portion 18a engaging the inside of the tubular frame member 22a. Similarly, in the rear pivot assembly of FIG. 11, the frame member 22b cooperates with a transversely oriented pivot shaft 52 which has a shaft portion 52a engaging the inside of the tubular frame member 22b. The pivot shafts 18 and 52 of the two pivot assemblies are rotatably supported in aligned bores of a front pivot bearing 12 and a rear pivot bearing 46, respectively.

The two pivot bearings 12 and 46 are attached to the machine base 10 by means of attachment bolts 53. For this purpose, they have inwardly offset horizontal leg portions 12' and 46', respectively, with which they engage the upper surfaces of two mounting pads 11. The latter are welded to the horizontal flange potions 10a of the machine base 10. As can be seen in FIGS. 4 and 5, the horizontal leg portions 12' and 46' of the two pivot bearings are also offset rearwardly from the pivot bores, so that the transverse pivot axis is located above and in front of the forward end wall 10b of the machine base 10.

The twofold offset of the leg portions 12' and 46' makes is possible to arrange the longitudinal members 22a and 22b of the pivot frame 22 at the same lateral spacing and in vertical alignment with the machine base, so that the leg portions will also serve as vertical abutment members for the pivot frame in its horizontal orientation. This, in turn, means that the same machine base, with minimal or no modifications at all, can also be used to directly support the die closing unit in horizontal orientation, without the interposition of the pivoting frame.

As can be seen in FIGS. 10 and 11, the longitudinal members 22a and 22b of the pivot frame 22 are not attached to the pivot shafts 18 and 52, but form axially slidable assemblies therewith. This is accomplished by two diametrally opposite chord grooves in the pivot shafts 18 and 52 which form outer vertical guide faces 66 engaged by the vertical flange portions 22a''' and 22b''' of the longitudinal frame members 22a and 22b and by two guide members 70 at the inner extremities of the pivot shafts 18 and 52 which form oppositely oriented inner guide faces 66a engaged by the vertical wall portions 22a' and 22b' of the same frame members.

The guide members 70 have a C-shaped cross section and a generally rectangular outline, being likewise die-formed of heavy-gauge sheet metal. Their height is such that they also bear against the horizontal wall portions of the longitudinal frame members 22a and 22b. The inner extremities of the pivot shaft portions 18a and 52a are in the form of locking protrusions 18a' and 52a', respectively, engaging matching locking bores 70a of the two guide members 70. The locking protrusions 18a' and 52a' are formed by diametrally opposite chord recesses in parallel alignment with the chord grooves. The locking bores of the guide members 70 have matching flats 70b, thus providing not only a vertical positioning function for the pivot frame in relation to the inner extremities of the pivot shafts 18 and 52, but also a rotational locking function between the pivot shafts 18 and 52 and the longitudinal frame members 22a and 22b.

While the longitudinal frame members 22a and 22b of the pivot frame 22 are thus rendered axially displaceable in relation to the pivot shafts 18 and 52, their displaceability can be blocked by a special clamping configuration which produces a rigid connection between the pivot frame members and the pivot shafts. This is accomplished by applying an axially outwardly directed pulling force to the pivot shafts 18 and 52 with the aid of two threaded clamping plugs 14 and 47 which engage threaded bores in the outer extremities of the pivot shafts 18 and 52, respectively.

The pulling force of the clamping plugs 14 and 47 is transmitted by the outer guide faces 66 of the chord grooves to the vertical flange portions 22a''' and 22b''' of the longitudinal frame members which are thereby clamped against inner clamping faces of the pivot bearing 12 and 47, respectively. As can readily be seen in FIGS. 10 and 11, this axial clamping action also blocks the pivotal displaceability of the pivot frame members 22a and 22b in relation to the stationary pivot bearings. The pivot connections are thus transformable into axially and rotationally rigid connections between the pivot frame 22 and the machine base 10 of the injection molding machine.

The front pivot assembly of FIG. 10 differs from the rear pivot assembly of FIG. 11 in that the latter includes a worm gear drive for the mechanical reorientation of the pivot frame 22 and attached die closing unit between the horizontal orientation of FIG. 1 and the vertical orientation of FIG. 3. The worm gear drive consists of a worm gear 49 which is arranged on a trunnion of the pivot shaft 52 and a worm 51 on a drive shaft which has on one extremity a faceted end portion 45 (FIG. 5) adapted for engagement by a driving wrench or a driving socket, for example. The worm gear 49 is rotatably connected to the pivot shaft 52 by means of a key 50. The inner half of the housing of the worm gear drive is integral with the rear pivot bearing 47, and the outer half of the housing is formed by a removable cover 44.

The clamping plug 14 of the front pivot assembly, when tightened, presses against the pivot bearing 12 by means of a pressure disc 13. The clamping plug 47 of the rear pivot assembly uses a similar pressure disc 48 which, instead of directly engaging the pivot bearing 46, engages the outer side of the worm gear 49, thereby pressing the latter against the pivot bearing 46. The result is an additional clamping action on the worm gear 49 which augments the rotational clamping action between the longitudinal frame member 22b and the pivot bearing 46. The worm gear 49 engages the trunnion of the pivot shaft 52 with a sliding fit, for axial displacement of the worm gear during tightening and release of the clamping plug 47.

The clamping plugs 14 and 47 which maintain the die closing unit in a stable rotational and axial position must be loose during position adjustments. This means that the pivotal torque which is exerted by the weight of the forwardly overhanging pivot frame and attached die closing unit on the pivot connections is opposed only by the self-locking worm gear drive on the rear pivot connection.

In order remove this load from the worm gear drive in the horizontal end position, the invention further suggests the arrangement of a retaining pin 16 in the front pivot assembly, as is shown in FIG. 2. The retaining pin 16 is guided inside a threaded sleeve 41 which is seated in a vertical flange portion of the pivot bearing 12. The pin 16 is biased inwardly by means of a compression spring 17, so that its extremity extends into engagement with the edge of the lower vertical flange portion 22a''' of the longitudinal frame member 22a.

The retaining pin 16 holds the longitudinal frame member 22a against the horizontal leg portion 12' of the pivot bearing 12, thereby relieving the worm gear drive of the overhang-created torque load in the horizontal orientation of the die closing, until the clamping plugs 14 and 47 are tightened. A release knob 15 attached to the outer extremity of the retaining pin 16 serves to manually retract the pin in opposition to the spring 17.

In the vertical orientation of the die closing unit (FIG. 3), the weight of the overhanging die closing unit urges the latter into the vertical end position, so that the worm gear drive can be relieved of torque, without providing a separate position maintenance function during position adjustment operations, when the clamping plugs 14 and 47 are loose. The exact vertical end position of the pivot frame 22 can be set by means of adjustable stops 27 arranged near the forward extremities of the longitudinal frame members 22a and 22b.

Referring to FIGS. 4–7 of the drawing, it can be seen that the pivot frame 22 includes a single cross member or transverse frame member 22d which is welded to the two longitudinal frame members 22a and 22b at their rearward extremities. The transverse frame member 22d has the same tubular cross section as the longitudinal frame members, including a rearwardly outwardly facing slot S'.

As can best be seen in FIG. 7, the pivoting mechanism of the invention further includes means for mechanically effecting the longitudinal repositioning displacements of the pivot frame 22 and attached die closing unit in relation to the pivot shafts. This repositioning means consists primarily of two threaded spindles 19 which are arranged inside the longitudinal frame members 22a and 22b, where they reach through and cooperate with transverse threaded bores in the shaft portions 18a and 52a of the pivot shafts 18 and 52.

The spindles 19 have a threaded length portion which provides axial adjustablility of the pivot frame 22 in relation to the pivot shafts 18 and 52 over a range b, as shown in FIGS. 4 and 5. As can be seen in FIG. 8, the spindles 19 are axially retained by means of two thrust bearings 20 arranged on opposite sides of the vertical wall portion 22d' of the transverse frame member 22d which, for this purpose, extends across the width of the longitudinal frame members 22a and 22b. Each spindle 19 has a portion 19a of reduced diameter reaching through the bearings 20. A cap-like drive member 38 is attached to the spindle portion 19a by means of a transverse pin 39, thereby positioning the spindle 19 in the axial sense.

Each drive member 38 has a faceted—e.g. hexagonal—outer end portion 38a designed for engagement by a wrench or drive socket. The two threaded spindles 19 are rotatably connected for synchronous operation by means of an endless roller chain 40 engaging sprockets 38a on the periphery of the drive members 38. This makes is possible to obtain an axial adjustment displacement of the die closing unit by manually applying a rotational force to one or the other of the two spindles. A cover strip 43 of sheet metal is attached to the end face of the wall portion 22d' by means of screws 42, the strip 43 serving as a chain guard by closing the slot S'.

The axial adjustability of the pivot frame and attached die closing unit is an indispensible requirement, when the die closing unit is oriented vertically, as shown in FIG. 3, where the horizontal axis of the plastification cylinder is at a fixed level and where injection molding dies 30 of differing axial dimensions have to be brought into alignment with the injection nozzle of the plastification cylinder, for radial injection in the partition plane of the injection molding die.

The pivoting mechanism of the present invention, by offering mechanical drives for the pivotal and axial repositioning of a pivot frame and a fixedly attached die closing unit, is particularly suited for use with a heavy die closing unit, when the injection molding machine has to have a selectively axial or radial injection capability with a horizontally arranged injection unit.

It should be understood, of course, that the foregoing disclosure describes only a preferred embodiment of the invention and that it is intended to cover all changes and modifications of this example of the invention which fall within the scope of the appended claims.

I claim the following:

1. In an injection molding machine which has a machine base carrying a die closing unit with stationary and movable die carrier plates designed to hold the stationary and movable die halves of an injection molding die, and a drive assembly producing die opening and closing movements along the longitudinal center axis of the die closing unit which is defined by parallel tie rods guiding the movable die carrier plate, in such a machine, a mechanism for pivotably repositioning the die closing unit between a normal horizontal orientation in which the injection molding die is injectable in an axial direction by means of an injection unit which is mounted horizontally on the machine base, in axial alignment with the die closing unit, and a vertical orientation in which the injection molding die is injectable in a radial direction by means of said horizontally mounted injection unit, said pivoting mechanism comprising in combination:

a pivot frame having two transversely spaced longitudinal frame members which are arranged below and in parallel alignment with said tie rods, the pivot frame being fixedly attached to the stationary structure of the die closing unit to form a rigid pivot assembly therewith;

two transversely spaced stationary pivot bearings arranged on an upper longitudinal extremity of the machine base, laterally outside said longitudinal frame members, the pivot bearings having axially aligned bores defining a fixed horizontal pivot axis on the machine base which extends transversely to the longitudinal center axis of the die closing unit and transversely to the said axial and radial directions of injection; and two pivot shafts rotatably received in the bores of the two pivot bearings, the pivot shafts having inwardly extending shaft portions which form connections with said longitudinal frame members, thereby providing support for the pivot frame and the attached die closing unit; and wherein the connections between the pivot shafts and the longitudinal frame members are shiftable longitudinally on said longitudinal frame members.

2. A pivoting mechanism as defined in claim 1, further comprising means for releasably clamping the longitudinal frame members of the pivot frame against the two pivot shafts, so as to secure the pivot frame and the attached die closing unit in any longitudinal adjustment position.

3. A pivoting mechanism as defined in claim 1, further comprising means for releasably clamping the longitudinal frame members of the pivot frame against rotational clamping faces of the two bearing supports, so as to secure the pivot frame and the attached die closing unit in any pivotal and longitudinal adjustment position.

4. A pivoting mechanism as defined in claim 1, wherein the transverse pivot axis defined by the two pivot bearings is located above and longitudinally outside the machine base; and the pivot frame is located above the machine base in its horizontal orientation and forwardly adjacent to the machine base in its vertical orientation.

5. A pivoting mechanism as defined in claim 1, wherein the longitudinally shiftable connections between the two pivot shafts and the longitudinal frame members are defined by the longitudinal frame members having a hollow, laterally outwardly open cross-sectional profile and by said inwardly extending shaft portions of the pivot shafts being slidably received within the profile of said frame members.

6. A pivoting mechanism as defined in claim 5, wherein said longitudinally shiftable connections include means for rotatably connecting at least one pivot shaft with the associated longitudinal frame member, for the transmission of a pivoting torque from said pivot shaft to the pivot frame.

7. A pivoting mechanism as defined in claim 6, further comprising mechanical means for pivotally repositioning the pivot assembly through the application of a pivoting torque to said rotatably connected pivot shaft.

8. A pivoting mechanism as defined in claim 7, wherein the pivotal repositioning means includes a worm gear drive which is connected to said rotatably connected pivot shaft; and the worm gear drive is of the self-locking type, so as to maintain the pivot assembly in any pivotal position.

9. A pivoting mechanism as defined in claim 6, further comprising mechanical means for longitudinally repositioning the pivot assembly in relation to said fixed pivot axis at said longitudinally shiftable connections between the two pivot shafts and the two longitudinal frame members.

10. A pivoting mechanism as defined in claim 9, wherein the longitudinal repositioning means includes two threaded spindles engaging the two pivot shafts and the two longitudinal frame members for the creation, through rotation of the spindles, of longitudinal displacements of the pivot assembly; and the two threaded spindles are of the self-locking type, so as to maintain the pivot assembly in any longitudinal position, irrespective of its pivotal orientation.

11. A pivoting mechanism as defined in claim 10, wherein the two threaded spindles engage threaded bores in said inwardly extending shaft portions of the pivot shafts; and the two spindles are connected to rotate in synchronism.

12. A pivoting mechanism as defined in claim 11, wherein the pivot frame further includes at least one transverse frame member extending between the two longitudinal frame members; and the two threaded spindles are rotatably connected by means of an endless chain arranged near the transverse frame member.

13. A pivoting mechanism as defined in claim 6, wherein the longitudinal members of the pivot frame have a rectangular tubular cross-sectional profile defined by an inner wall portion adjoined by upper and lower horizontal wall portions and an outer wall portion with a central longitudinal slot which is bordered by upper and lower vertical flange portions; and the inwardly extending shaft portions of the two pivot shafts reach through said slots into the longitudinal frame members.

14. A pivoting mechanism as defined in claim 13, wherein the inwardly extending shaft portions of the two pivot shafts have each two diametrally oppositely located chord grooves cooperating with said upper and lower vertical flange portions of the associated longitudinal frame members, to form part of a guidance configuration for said longitudinally shiftable connections.

15. A pivoting mechanism as defined in claim 14, wherein each pivot shaft carries on its inner extremity a guide member which is arranged to slidably engage the inside of the inner vertical wall portion of the associated longitudinal frame member and to cooperate with its upper and lower horizontal wall portions, so as to form another part of said guidance configuration.

16. A pivoting mechanism as defined in claim 15, wherein said guide members are of generally rectangular outline, being non-rotatable inside the frame member and non-rotatably connected to the inner extremities of the pivot shafts, the guide members thereby defining said rotatable locking means.

17. A pivoting mechanism as defined in claim 14, wherein each pivot shaft has in its outer extremity a threaded axial bore which is engaged by a threaded clamping plug;

each pivot bearing has a substantially planar clamping face facing inwardly and arranged for cooperation with the upper and lower vertical flange portions of the longitudinal frame members; and each clamping plug, when tightened, bears against the outer side of the associated pivot bearing, thereby pulling the pivot shaft outwardly, for a clamping interaction between the chord grooves of its inwardly extending shaft portion and the upper and lower flange portions of the longitudinal frame members.

* * * * *